United States Patent
Morioka et al.

(10) Patent No.: US 9,775,052 B2
(45) Date of Patent: Sep. 26, 2017

(54) SUPERORDINATE BASE STATION, SUBORDINATE BASE STATION, AND RADIO COMMUNICATION SYSTEM

(71) Applicant: NTT DOCOMO, INC., Tokyo (JP)

(72) Inventors: Yasufumi Morioka, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 111 days.

(21) Appl. No.: 14/759,253

(22) PCT Filed: Jul. 9, 2013

(86) PCT No.: PCT/JP2013/068740
§ 371 (c)(1),
(2) Date: Jul. 6, 2015

(87) PCT Pub. No.: WO2014/109082
PCT Pub. Date: Jul. 17, 2014

(65) Prior Publication Data
US 2015/0358832 A1 Dec. 10, 2015

(30) Foreign Application Priority Data
Jan. 9, 2013 (JP) .................................. 2013-001813

(51) Int. Cl.
H04L 12/28 (2006.01)
H04W 16/32 (2009.01)
H04W 92/20 (2009.01)

(52) U.S. Cl.
CPC ............ *H04W 16/32* (2013.01); *H04W 92/20* (2013.01)

(58) Field of Classification Search
CPC .................................................. H04W 16/32
(Continued)

(56) References Cited

U.S. PATENT DOCUMENTS

2012/0208518 A1* 8/2012 Deng .................... H04W 48/10
455/419
2014/0004863 A1* 1/2014 Zhang ............... H04W 36/0033
455/444
(Continued)

FOREIGN PATENT DOCUMENTS

EP 2 866 494 A1 4/2015
EP 2 871 913 A1 5/2015
(Continued)

OTHER PUBLICATIONS

NTT Docomo, Inc., Requirements, Candidate Solutions & Technology Roadmap for LTE Rel-12 Onward, 3GPP Workshop on Release 12 and onwards RWS-120010, Jun. 12, 2012.*
(Continued)

*Primary Examiner* — Guang Li
(74) *Attorney, Agent, or Firm* — Osha Liang LLP

(57) ABSTRACT

A superordinate base station, a subordinate base station with control functionality that is more limited than the control functionality of the superordinate base station, a user device that can communicate by radio with the superordinate base station and with the subordinate base station, a switching center, and a gateway device are provided. The superordinate base station has interfaces for control-plane communication and a transceiving unit that performs transceiving with the subordinate base station through an X3 interface. The subordinate base station has an interface for user-plane communication and an X3 interface for communication with the superordinate base station. Operations of the subordinate base station are controlled by control messages transmitted from the superordinate base station.

12 Claims, 7 Drawing Sheets

(58) Field of Classification Search
USPC .......................................................... 370/254
See application file for complete search history.

(56) References Cited

U.S. PATENT DOCUMENTS

| | | | | |
|---|---|---|---|---|
| 2014/0080484 | A1* | 3/2014 | Centonza | H04W 76/045 455/436 |
| 2014/0204771 | A1* | 7/2014 | Gao | H04W 36/28 370/252 |
| 2015/0156802 | A1* | 6/2015 | Morioka | H04W 36/0083 370/328 |
| 2015/0282238 | A1* | 10/2015 | Aminaka | H04W 76/022 370/329 |
| 2015/0282239 | A1* | 10/2015 | Han | H04W 76/025 370/329 |

FOREIGN PATENT DOCUMENTS

| | | |
|---|---|---|
| EP | 2 906 009 A1 | 8/2015 |
| EP | 2 919 520 A1 | 9/2015 |
| WO | 2011/034966 A1 | 3/2011 |

OTHER PUBLICATIONS

Extended European Search Report in counterpart European Application No. 13870791.4 dated Jan. 7, 2016 (8 pages).

H. Ishii, et al.; "A Novel Architecture for LTE-B: C-plane/U-plane Split and Phantom Cell Concept"; 2012 IEEE Globecom Workshops, XP032341446, pp. 624-630; Dec. 2012 (7 pages).

Office Action in counterpart Japanese Patent Application No. 2013-001813 dated Jul. 7, 2015 (7 pages).

International Search Report issued in corresponding PCT Application No. PCT/JP2013/068740 dated Sep. 10, 2013 (1 page).

3GPP TS 36.300 V11.1.0; "3rd Generation Partnership Project; Technical Specification Group Radio Access Network; Evolved Universal Terrestrial Radio Access (E-UTRA) and Evolved Universal Terrestrial Radio Access Network (E-TRAN); Overall description; Stage 2 (Release 11)"; X2 Interface (Clause 20), pp. 153-161; Mar. 2012 (10 pages).

NTT Docomo, Inc.; "Requirements, Candidate Solutions & Technology Roadmap for LTE Rel-12 Onward"; 3GPP Workshop on Release 12 and onwards, RWS-120010, Ljubljana, Slovenia; Jun. 11-12, 2012 (27 pages).

3GPP TS 23.002 V12.1.0; "3rd Generation Partnership Project; Technical Specification Group Services and System Aspects; Network architecture (Release 12)"; pp. 48-52; Dec. 2012 (6 pages).

3GPP TR 36.806 V9.0.0; "3rd Generation Partnership Project; Technical Specification Group Radio Access Network; Evolved Universal Terrestrial Radio Access (E-UTRA); Relay architectures for E-UTRA (LTE-Advanced) (Release 9)"; pp. 16-18; Mar. 2010 (4 pages).

* cited by examiner

SUPERORDINATE BASE STATION, SUBORDINATE BASE STATION, AND RADIO COMMUNICATION SYSTEM

TECHNICAL FIELD

The present invention relates to superordinate base stations, subordinate base stations, and radio communication systems.

BACKGROUND ART

A variety of radio communication systems that operate in accordance with 3GPP (Third Generation Partnership Project) protocols are used in the art. In a radio communication system that operates in accordance with LTE/SAE (Long Term Evolution/System Architecture Evolution) protocols, which are parts of 3GPP protocols, an X2 interface is specified as an interface that connects base stations (eNB). Each base station communicates with another base station through an X2 interface. An X2 interface is specified to connect base stations that are of equal rank.

RELATED ART DOCUMENT

Non-Patent Document

Non-Patent Document 1: 3GPP TS 36.300 V11.1.0 (2012-03), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), X2 Interface (Clause 20)

SUMMARY OF THE INVENTION

Problem to be Solved by the Invention

A radio communication system that includes a base station (eNB) such as described above is assumed to further include another new base station with control functionality that is limited compared with the control functionality of the base station (eNB). The base station with limited control functionality is, for example, a base station that cannot establish radio connection with a user device by itself. This new type of base station is to operate under control of the base station that is superordinate (eNB). Because an X2 interface connects, as stated above, base stations that are of equal rank, it is difficult for the new base station with limited control functionality to connect to the base station that is superordinate (eNB) through an X2 interface.

In light of the situation described above, an object of the present invention is to enable nodes to appropriately communicate with one another in a radio communication system in which there is a hierarchical relationship (difference in rank) between base stations.

Means of Solving the Problems

A superordinate base station according to the present invention is in a radio communication system that includes: the superordinate base station; a subordinate base station in which control functionality is more limited than the control functionality of the superordinate base station; a user device that communicates by radio with each of the superordinate base station and the subordinate base station; a switching center; and a gateway device. The subordinate base station has neither an interface for control-plane communication with the user device nor an interface for control-plane communication with the switching center. The superordinate base station has: a Uu-C interface for control-plane communication with the user device; an X3 interface for at least one of control-plane communication and user-plane communication with the subordinate base station; an S1-MME interface for control-plane communication with the switching center; and a transceiving unit that performs transceiving with the subordinate base station through the X3 interface.

In a preferred embodiment of the present invention, the transceiving unit relays, from among control messages transmitted from the switching center, a subordinate-base-station control message to the subordinate base station through the X3 interface, the subordinate-base-station control message controlling the subordinate base station.

In another preferred embodiment of the present invention, the transceiving unit relays, from among user data transmitted from the gateway device, subordinate-user data to the subordinate base station through the X3 interface, the subordinate-user data being directed to a user device that is connected to the subordinate base station by radio.

In yet another preferred embodiment of the present invention, the transceiving unit directly transmits to the user device, through the Uu-C interface, from among control messages transmitted from the switching center, a subordinate-user control message directed to a user device that is connected to the subordinate base station by radio.

In yet another preferred embodiment of the present invention, the X3 interface, based on a Stream Control Transmission Protocol, provides guaranteed transmission of a control message that passes through the X3 interface. Two communication identifiers are set to the superordinate base station and the subordinate base station, the two communication identifiers identifying a bearer that is established through the X3 interface for transmitting the control message.

In a preferred embodiment of the present invention, the superordinate base station further includes a first bearer controller that assigns a first communication identifier to the superordinate base station, the first communication identifier being one of the two communication identifiers. The subordinate base station includes a second bearer controller that assigns a second communication identifier to the subordinate base station, the second communication identifier being the other one of the two communication identifiers. The first bearer controller transmits the first communication identifier to the subordinate base station through the X3 interface and stores the second communication identifier received through the X3 interface from the second bearer controller.

In a preferred embodiment of the present invention, the X3 interface is provided by wired connection. In another preferred embodiment of the present invention, the X3 interface is provided by radio connection.

A subordinate base station according to the present invention is in a radio communication system that includes: a superordinate base station; the subordinate base station in which control functionality is more limited than the control functionality of the superordinate base station; a user device that communicates by radio with each of the superordinate base station and the subordinate base station; a switching center; and a gateway device. The subordinate base station has: a PhUu interface for user-plane communication with the user device; and an X3 interface for at least one of control-plane communication and user-plane communication with the superordinate base station. Operations of the subordinate base station are controlled by a control message transmitted from the superordinate base station through the X3 interface.

In a preferred embodiment of the present invention, the subordinate base station further has an S1-U interface for user-plane communication with the gateway device.

In another preferred embodiment of the present invention, the subordinate base station further has an X2 interface for control-plane and user-plane communication with another subordinate base station.

In still another preferred embodiment of the present invention, the subordinate base station has no functionality to select at least one switching center from among multiple switching centers.

In another preferred embodiment of the present invention, the subordinate base station has no functionality to select at least one gateway device from among multiple gateway devices.

In another preferred embodiment of the present invention, the subordinate base station includes a base station selector that selects at least one superordinate base station from among multiple superordinate base stations when the X3 interface is set up.

In another preferred embodiment of the present invention, the X3 interface, based on a Stream Control Transmission Protocol, provides guaranteed transmission of the control message that passes through the X3 interface. Two communication identifiers are set to the superordinate base station and the subordinate base station, the two communication identifiers identifying a bearer that is established through the X3 interface for transmitting the control message.

In another preferred embodiment of the present invention, the superordinate base station includes a first bearer controller that assigns a first communication identifier to the superordinate base station, the first communication identifier being one of the two communication identifiers. The subordinate base station includes a second bearer controller that assigns a second communication identifier to the subordinate base station, the second communication identifier being the other one of the two communication identifiers. The second bearer controller transmits the second communication identifier to the superordinate base station through the X3 interface and stores the first communication identifier received through the X3 interface from the first bearer controller.

In another preferred embodiment of the present invention, the X3 interface is provided by wired connection. In yet another preferred embodiment of the present invention, the X3 interface is provided by radio connection.

A radio communication system according to the present invention includes: a superordinate base station; a subordinate base station in which control functionality is more limited than the control functionality of the superordinate base station; a user device that communicates by radio with each of the superordinate base station and the subordinate base station; a switching center; and a gateway device. The superordinate base station has: a Uu-C interface for control-plane communication with the user device; an X3 interface for at least one of control-plane communication and user-plane communication with the subordinate base station; an S1-MME interface for control-plane communication with the switching center; and a transceiving unit that performs transceiving with the subordinate base station through the X3 interface. The subordinate base station has neither an interface for control-plane communication with the user device nor an interface for control-plane communication with the switching center. The subordinate base station has: a PhUu interface for user-plane communication with the user device; and an X3 interface for at least one of control-plane communication and user-plane communication with the superordinate base station. Operations of the subordinate base station are controlled by a control message transmitted from the superordinate base station.

Effect of the Invention

According to the present invention, a superordinate base station and a subordinate base station that are in a hierarchical relationship (i.e., are different in rank) are connected appropriately, and communication between nodes is performed appropriately.

MODES FOR CARRYING OUT THE INVENTION

1(1). Configuration of Radio Communication System

Figure 1:
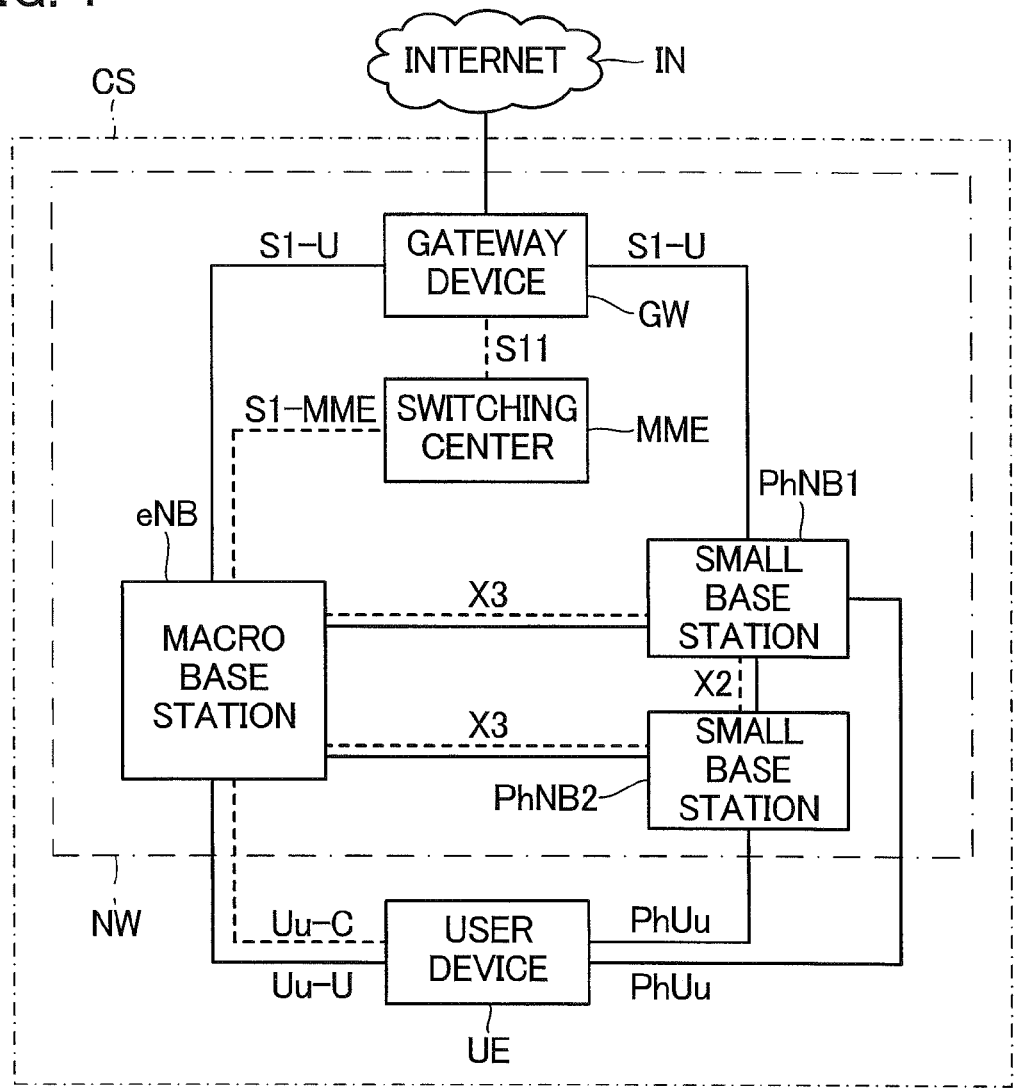
FIG. 1 is a block diagram showing a radio communication system according to an embodiment of the present invention.

FIG. 1 is a block diagram showing a radio communication system CS according to an embodiment of the present invention. The radio communication system CS includes, as its elements (nodes), a user device UE, a macro base station eNB, small base stations PhNB (PhNB1 and PhNB2), a switching center MME, and a gateway device GW. The radio communication system CS may include more than one of each of the above elements. A network NW includes the above elements that are included in the radio communication system CS, except for the user device UE.

Each element in the radio communication system CS performs communication in accordance with a predetermined access technology, e.g., LTE/SAE (Long Term Evolution/System Architecture Evolution) included in the 3GPP (Third Generation Partnership Project) protocols. In accordance with terms specified in the 3GPP protocols, the user device UE is a User Equipment, the macro base station eNB is an evolved Node B, the switching center MME is a Mobile Management Entity, and the gateway device GW is a Packet-Data-Network/Serving Gateway. The small base stations PhNB are base stations in which control functionalities depend entirely or partly on the macro base station eNB, and may be referred to as Phantom Node B's (details below).

In the present embodiment, while the radio communication system CS basically operates in accordance with LTE/SAE, the technical scope of the present invention is not limited thereto. The present invention can be used with other access technologies with design modifications, as necessary.

The user device UE can perform radio communication with the macro base station eNB and with the small base stations PhNB. A scheme for radio communication between the user device UE and each of the base stations (eNB and PhNB) can be chosen freely. For example, OFDMA (Orthogonal Frequency Division Multiple Access) may be adopted for downlink, whereas SC-FDMA (Single-Carrier Frequency Division Multiple Access) may be adopted for uplink. The macro base station eNB and the small base stations PhNB may use different schemes for radio communication.

The macro base station eNB is connected to the small base stations PhNB, to the switching center MME, and to the gateway device GW. A small base station PhNB (e.g., PhNB1) is connected to another small base station PhNB (e.g., PhNB2) and to the gateway device GW, as well as to the macro base station eNB. The switching center MME is connected to the gateway device GW, as well as to the macro base station eNB. The switching center MME may be connected to the small base stations PhNB. The gateway device GW is connected to an internet IN that is an external network of the radio communication system CS, as well as to each of the base stations (eNB and PhNB) and to the switching center MME; that is, the gateway device GW serves as a connecting point (an access point) to the external network. The above-described connections between nodes are typically wired connections, but all or some of them may be radio connections.

1(2). Connection Configuration Between Nodes

With reference to FIG. 1 again, a configuration of connections between nodes in the radio communication system CS is described. In FIG. 1, solid lines indicate paths on a user plane that are used to exchange user signals (voice signals, signals that indicate user data such as data signals, etc.), and dashed lines indicate paths on a control plane that are used to exchange control signals.

The macro base station eNB, with respect to the control plane, exchanges control signals with the user device UE using a Uu-C interface, exchanges control signals with the small base stations PhNB using X3 interfaces, and exchanges control signals with the switching center MME using an S1-MME interface. With respect to the user plane, the macro base station eNB exchanges user signals with the user device UE using a Uu-U interface and exchanges user signals with the gateway device GW using an S1-U interface.

A small base station PhNB (e.g., PhNB1), with respect to the control plane, exchanges control signals with the macro base station eNB using an X3 interface and exchanges control signals with another small base station PhNB (e.g., PhNB2) using an X2 interface. The small base station PhNB (e.g., PhNB1), with respect to the user plane, exchanges user signals with the user device UE using a PhUu interface, exchanges user signals with the other small base station PhNB (e.g., PhNB2) using an X2 interface, and exchanges user signals with the gateway device GW using an S1-U interface. The small base stations PhNB have neither control-plane interfaces for communication with the user device UE nor control-plane interfaces for communication with the switching center MME.

With respect to the user plane, the macro base station eNB and the small base station PhNB may exchange user signals using the X3 interface. In this case, even if the small base station PhNB is not connected to the gateway device GW, user signals can be exchanged between the small base station PhNB and the gateway device GW by being routed through the macro base station eNB. The X3 interface can be used for at least one of control-plane communication and user-plane communication.

For the conventional interfaces (X2 interfaces, S1-U interfaces, etc.), from among the above-mentioned interfaces, protocol structures in the EPS (Evolved Packet System) specified by 3GPP are adopted.

Figure 2:
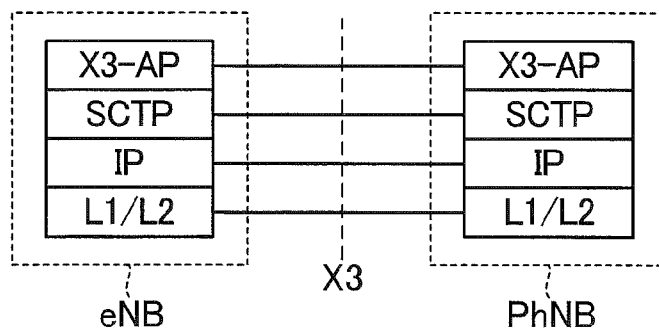
FIG. 2 is a diagram showing a control-plane protocol structure (protocol stack) of an X3 interface.

FIG. 2 is a diagram showing a control-plane protocol structure (protocol stack) of an X3 interface. With respect to the control plane, the X3 interface has a layered structure that includes an L1/L2 layer, an IP layer, an SCTP layer, and an X3-AP layer. The macro base station eNB and the small base station PhNB are interconnected at each of the layers that the X3 interface has. The L1/L2 layer corresponds to a physical layer and a data link layer of the OSI Reference Model. The Ethernet (registered trademark) protocol specified in IEEE 802.3, for example, may be adopted for the L1/L2 layer. The IP layer is an internet protocol layer. The SCTP layer is a stream control transmission protocol layer and has a function to guarantee that a control message from a sender reaches its destination (guarantee reachability of control messages). The X3-AP layer is a protocol for control signals between the macro base station eNB and the small base station PhNB, and performs an exchange of various control signals.

Figure 3:
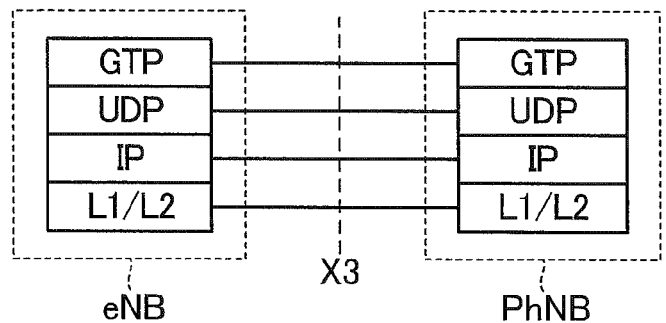
FIG. 3 is a diagram showing a user-plane protocol structure (protocol stack) of an X3 interface.

FIG. 3 is a diagram showing a user-plane protocol structure (protocol stack) of the X3 interface. With respect to the user plane, the X3 interface has a layered structure that includes an L1/L2 layer, an IP layer, a UDP layer, and a GTP layer. The L1/L2 layer and the IP layer are similar to those described above. The UDP layer is a user datagram layer and is a protocol to transmit messages without checking whether the messages have reached their destinations. The GTP layer is a GPRS (General Packet Radio Service) tunneling protocol layer and performs an exchange of user data between the macro base station eNB and the small base station PhNB.

As will be understood from the above description, the X3 interface is an interface that has both a control-plane interface (X3C) and a user-plane interface (X3U), and is an interface that ends at the macro base station eNB and at the small base station PhNB.

1(3). Bearer (Logical Communication Path)

In the radio communication system CS, signals (control signals and user signals) are exchanged using a bearer, which is a logical communication path. A bearer is a dynamic logical path that is established between nodes as necessary. A bearer can be established between nodes that are connected by wire or by radio. Non-limiting examples of bearers that are established in the present embodiment are described below. An X3 signal transmission bearer X3-B is established between the macro base station eNB and the small base station PhNB. An S1-U signal transmission bearer S1-U-B is established between the macro base station eNB and the gateway device GW. An S1-MME signal transmission bearer S1-MME-B is established between the macro base station eNB and the switching center MME. A control radio bearer SRB is established between the macro base station eNB and the user device UE. Multiple bearers may be established between the nodes.

Figure 4:
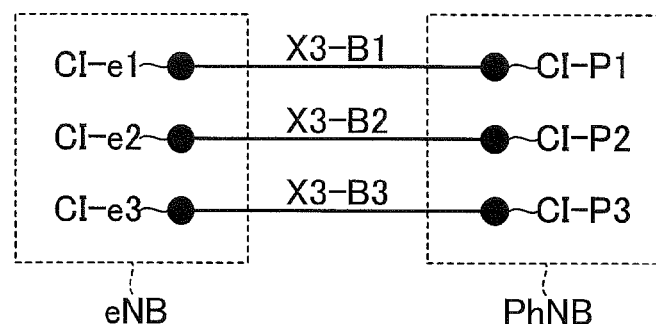
FIG. 4 is a diagram showing an example of bearers established between a macro base station eNB and a small base station PhNB.

FIG. 4 is a diagram showing an example of bearers (X3 signal transmission bearers X3-B) established between the macro base station eNB and the small base station PhNB. In FIG. 4, three X3 signal transmission bearers X3-B are established. An X3 signal transmission bearer X3-B can be identified by communication identifiers CI. As shown in the figure, for each X3 signal transmission bearer X3-B, a communication identifier CI is assigned to each of the two end points (the macro base station eNB and the small base station PhNB). For example, the uppermost X3 signal transmission bearer X3-B1 is identified by a communication identifier CI-e1 at the macro base station eNB and a communication identifier CI-P1 at the small base station PhNB. Other X3 signal transmission bearers, X3-B2 and X3-B3, are identified in a similar manner.

1(4). Configuration of Each Element

1(4)-1. Configuration of User Device

Figure 5:
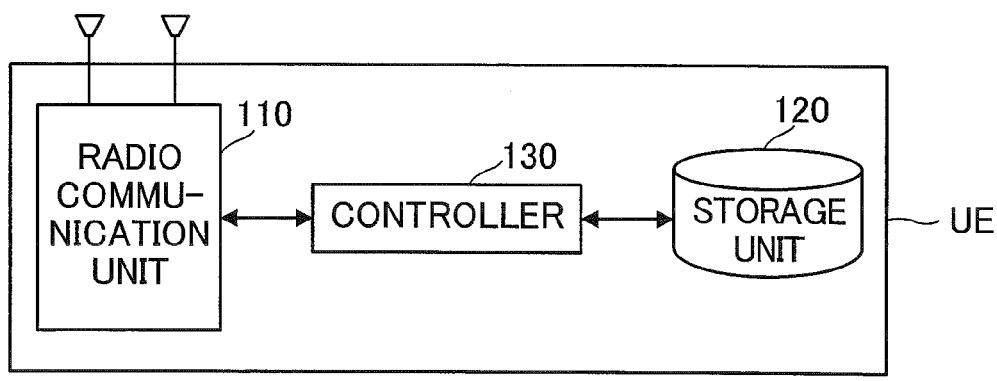
FIG. 5 is a block diagram showing a configuration of a user device.

FIG. 5 is a block diagram showing a configuration of the user device UE according to the present embodiment. The user device UE includes a radio communication unit 110, a storage unit 120, and a controller 130. In the figure, the illustrations of an output device outputting voice, images, etc., and an input device for accepting instructions from a user, etc., are omitted for brevity. The radio communication unit 110 is an element for performing radio communication with each of the base stations (the macro base station eNB and the small base stations PhNB). The radio communication unit 110 includes transceiving antennas, a receiving circuit for receiving radio signals (radio waves) and converting them to electrical signals, and a transmitting circuit for converting electrical signals, such as control signals and user signals, to radio signals (radio waves) and transmitting them. The controller 130 controls radio communication with the base stations (the macro base station eNB and the small base stations PhNB). The controller 130 is a functional block accomplished by the fact that a CPU (central processing unit; not shown in the figure) provided in the user device UE executes a computer program stored in the storage unit 120 and operates in accordance with the computer program.

1(4)-2. Configuration of Macro Base Station

Figure 6:
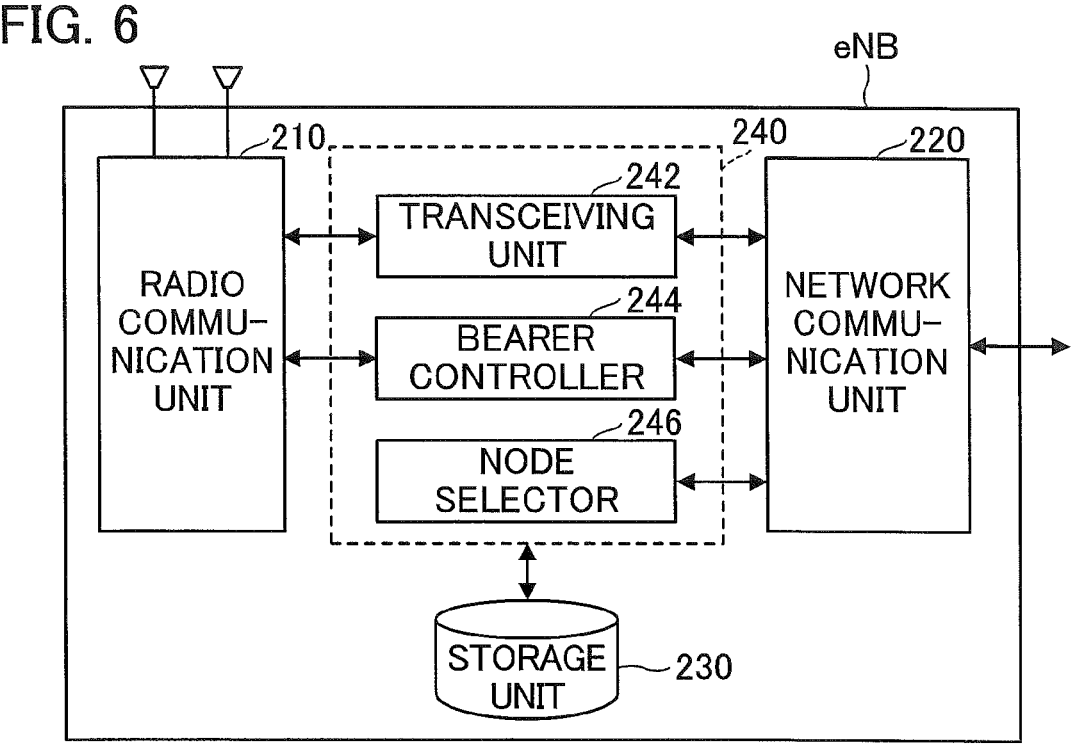
FIG. 6 is a block diagram showing a configuration of a macro base station.

FIG. 6 is a block diagram showing a configuration of the macro base station eNB according to the present embodiment. The macro base station eNB includes a radio communication unit 210, a network communication unit 220, a storage unit 230, and a controller 240. The radio communication unit 210 is an element for performing radio communication with the user device UE and has a configuration similar to that of the radio communication unit 110 of the user device UE. The network communication unit 220 is an element for performing communication with other nodes (the small base stations PhNB, the switching center MME, the gateway device GW, etc.) in the network NW, and exchanges electrical signals with the other nodes by wire or by radio. The storage unit 230 stores information related to communication control: for example, a communication identifier CI-e of its own station (i.e., the macro base station eNB) and a communication identifier CI-P of the small base station PhNB.

The controller 240 includes a transceiving unit 242, a bearer controller 244, and a node selector 246. The transceiving unit 242 exchanges signals with other nodes through the interfaces described above. The bearer controller 244 controls bearers established to the other nodes. The node selector 246 selects a node (the switching center MME, the gateway device GW, etc.) to which the macro base station eNB is to connect. Details of operations performed by the transceiving unit 242, the bearer controller 244, and the node selector 246 are described later. The controller 240 and the elements included in the controller 240 are functional blocks accomplished by the fact that a CPU (not shown in the figure) provided in the macro base station eNB executes a computer program stored in the storage unit 230 and operates in accordance with the computer program.

1(4)-3. Configuration of Small Base Station

Figure 7:
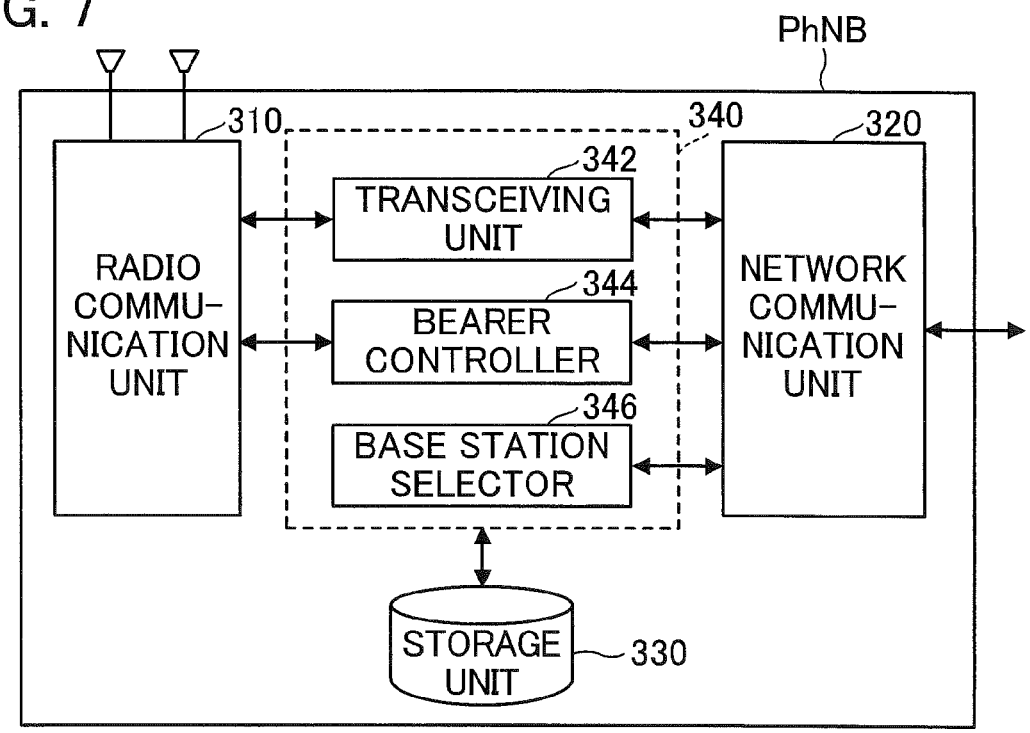
FIG. 7 is a block diagram showing a configuration of a small base station.

FIG. 7 is a block diagram showing a configuration of the small base station PhNB according to the present embodiment. The small base station PhNB includes a radio communication unit 310, a network communication unit 320, a storage unit 330, and a controller 340. The radio communication unit 310 is an element for performing radio communication with the user device UE and has a configuration similar to that of the radio communication unit 210 of the macro base station eNB. The network communication unit 320 is an element for performing communication with other nodes (the macro base station eNB, another small base station PhNB, the gateway device GW, etc.) in the network NW, and exchanges electrical signals with the other nodes by wire or by radio. The storage unit 330 stores information related to communication control: for example, the communication identifier CI-P of its own station (i.e., the small base station PhNB) and the communication identifier CI-e of the macro base station eNB.

The controller 340 includes a transceiving unit 342, a bearer controller 344, and a base station selector 346. The transceiving unit 342 exchanges signals with other nodes through the interfaces described above. The bearer controller 344 controls bearers established to the other nodes. The base station selector 346 selects a macro base station eNB to which the small base station PhNB is to connect. Details of operations performed by the transceiving unit 342, the bearer controller 344, and the base station selector 346 are described later. The controller 340 and the elements included in the controller 340 are functional blocks accomplished by the fact that a CPU (not shown in the figure) provided in the small base station PhNB executes a computer program stored in the storage unit 330 and operates in accordance with the computer program.

1(4)-4. Configuration of Switching Center

Figure 8:
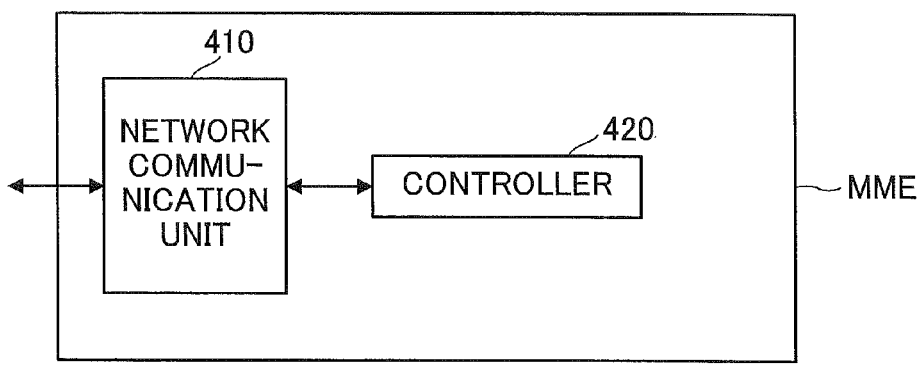
FIG. 8 is a block diagram showing a configuration of a switching center.

FIG. 8 is a block diagram showing a configuration of the switching center MME according to the present embodiment. The switching center MME includes a network communication unit 410 and a controller 420. The network communication unit 410 is an element for performing communication with other nodes (the macro base station eNB, the gateway device GW, etc.) in the network NW, and exchanges electrical signals with the other nodes by wire or by radio. The controller 420 transmits control signals to each node (the user device UE, the macro base station eNB, the small base stations PhNB, etc.) through an S1-MME interface. The controller 420 is a functional block accomplished by the fact that a CPU (not shown in the figure) provided in the switching center MME executes a computer program stored in a storage unit (not shown in the figure) and operates in accordance with the computer program.

1(4)-5. Configuration of Gateway Device

Figure 9:
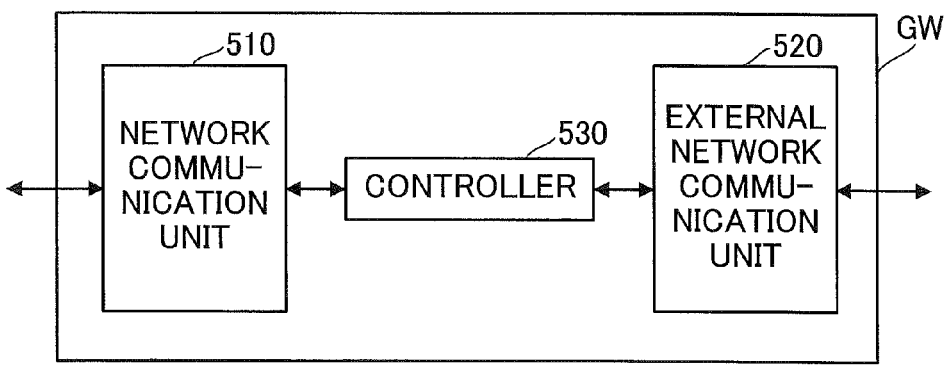
FIG. 9 is a block diagram showing a configuration of a gateway device.

FIG. 9 is a block diagram showing a configuration of the gateway device GW according to the present embodiment. The gateway device GW includes a network communication unit 510, an external network communication unit 520, and a controller 530. The network communication unit 510 is an element for performing communication with other nodes (the macro base station eNB, the small base stations PhNB, the switching center MME, etc.) in the network NW, and exchanges electrical signals with the other nodes by wire or by radio. The external network communication unit 520 is an element for performing communication with the internet IN and performs protocol conversion of user signals as necessary. The controller 530 exchanges control signals with the switching center MME and relays user data between the network NW and the internet IN. The controller 530 is a functional block accomplished by the fact that a CPU (not shown in the figure) provided in the gateway device GW executes a computer program stored in a storage unit (not shown in the figure) and operates in accordance with the computer program.

1(5). Signal Relaying at Macro Base Station

Figure 10:
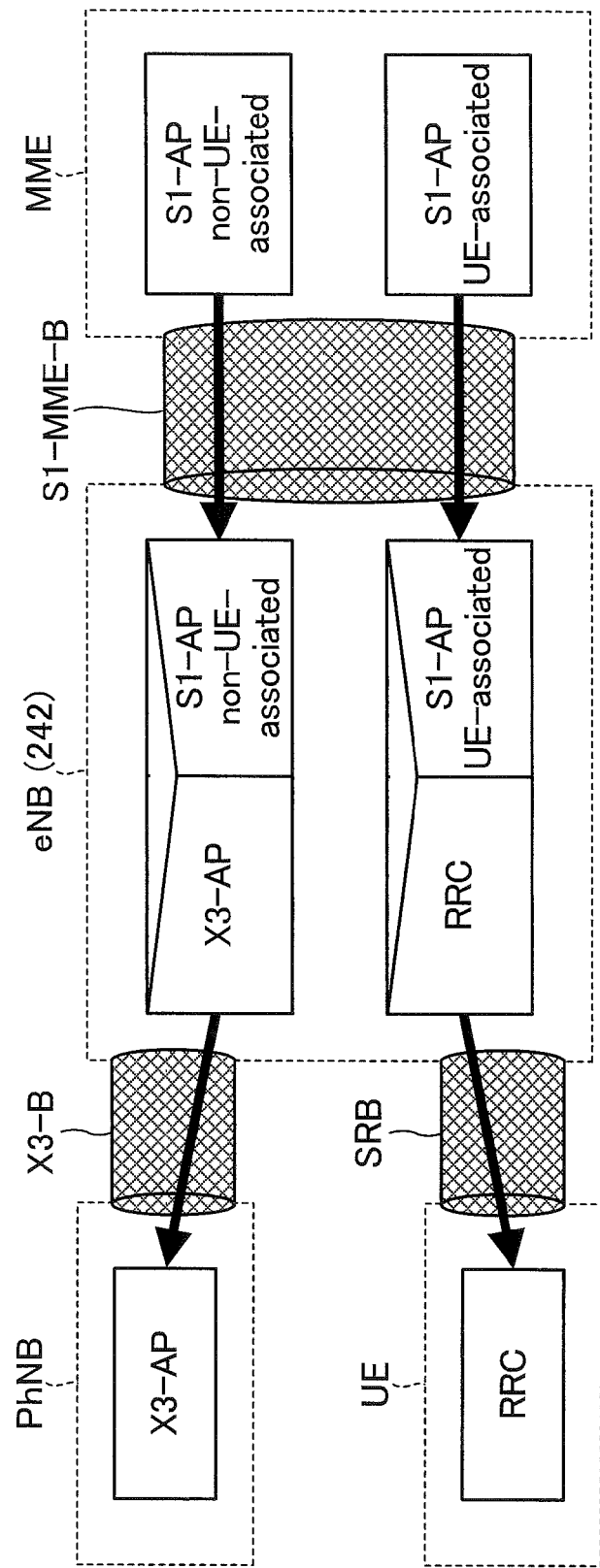
FIG. 10 is a diagram describing how control signals (control messages) are relayed by the macro base station.

FIG. 10 is a diagram describing how control signals (control messages) are relayed by the macro base station eNB (the transceiving unit 242). As shown in FIG. 10, the transceiving unit 242 of the macro base station eNB relays, from among control messages transmitted from the switching center MME through the S1-MME interface (using the S1-MME signal transmission bearer S1-MME-B), control messages that control the small base station PhNB (non-UE-associated signals) to the small base station PhNB through the X3 interface (using the X3 signal transmission bearer X3-B). The non-UE-associated signals are also referred to as subordinate-base-station control messages.

The transceiving unit 242 transmits, from among the control messages transmitted from the switching center MME through the S1-MME interface (using the S1-MME signal transmission bearer S1-MME-B), control messages that are directed to a user device UE that is connected by radio to the small base station PhNB (UE-associated signals), directly to the user device UE through the Uu-C interface (using the control radio bearer SRB). The UE-associated signals are also referred to as subordinate-user control messages.

Figure 11:
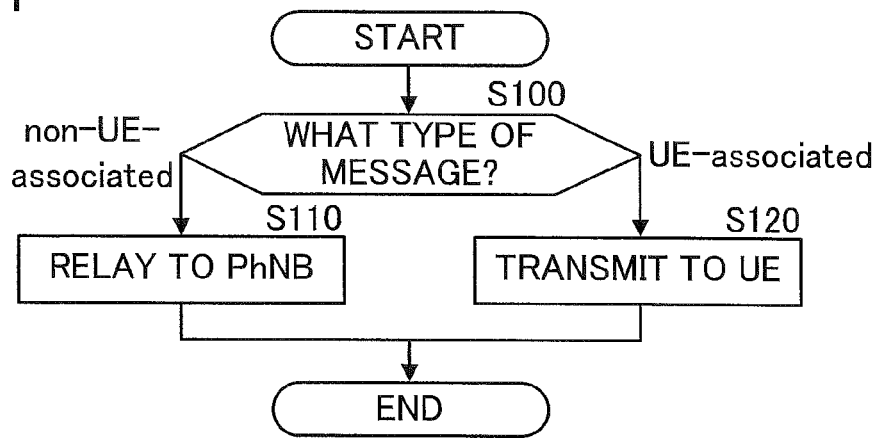
FIG. 11 is a flowchart for a control signal relaying operation performed by the macro base station.

FIG. 11 is a flowchart for a control signal relaying operation performed by the transceiving unit 242 of the macro base station eNB. After receiving a control signal from the switching center MME, the transceiving unit 242 determines whether the control signal is a non-UE-associated signal or a UE-associated signal (S100). If the control signal is a non-UE-associated signal, the transceiving unit 242 converts the control signal so that the control signal conforms to the protocol for the X3 interface (X3-AP), and relays the converted control signal to the small base station PhNB using the X3 signal transmission bearer X3-B (S110). The control signal controls operations of the small base station PhNB. If the control signal is a UE-associated signal, the transceiving unit 242 converts the control signal so that the control signal conforms to the protocol for the Uu-C interface (RRC), and relays the converted control signal to the user device UE using the control radio bearer SRB (S120).

Figure 12:
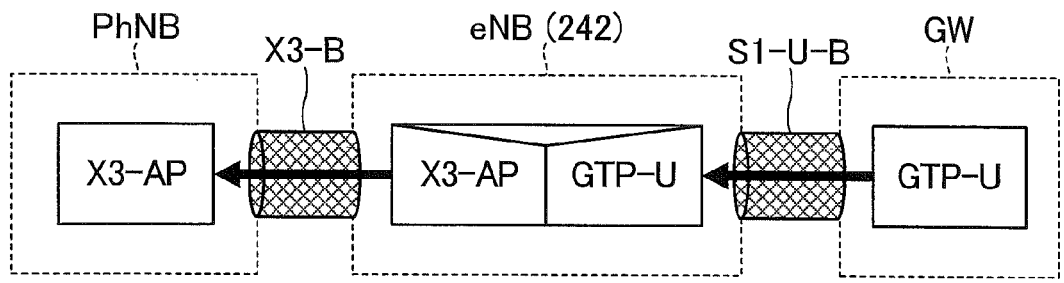
FIG. 12 is a diagram describing how user signals (user data) are relayed by the macro base station.

FIG. 12 is a diagram describing how user signals (user data) are relayed by the macro base station eNB (the transceiving unit 242). As shown in FIG. 12, the transceiving unit 242 of the macro base station eNB relays, from among user data transmitted from the gateway device GW through the S1-U interface (using the S1-U signal transmission bearer S1-U-B), user data that are directed to the user device UE that is connected by radio to the small base station PhNB (subordinate-user data), to the small base station PhNB, through the X3 interface (using the X3 signal transmission bearer X3-B). User data that are directed to a user device UE that is connected by radio to the macro base station eNB (superordinate-user data) are transmitted directly to the user device UE by the transceiving unit 242 through the Uu-U interface (using a data radio bearer).

Figure 13:
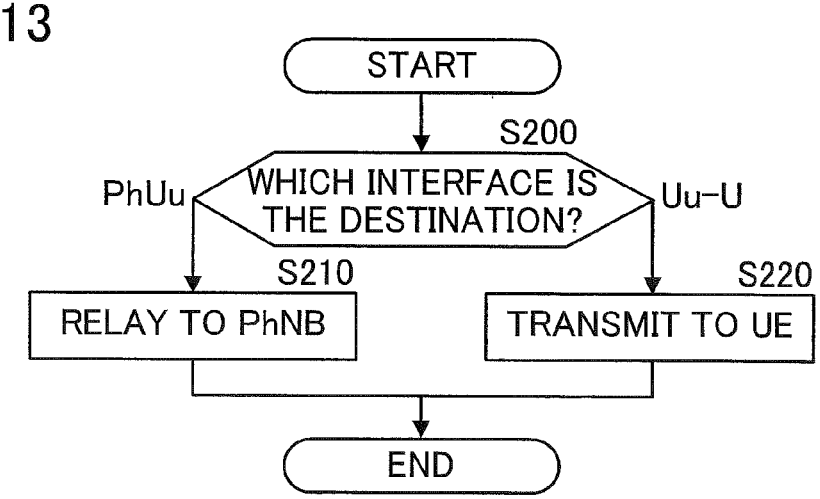
FIG. 13 is a flowchart for a user signal relaying operation performed by the macro base station.

FIG. 13 is a flowchart for a user signal relaying operation performed by the transceiving unit 242 of the macro base station eNB. After receiving a user signal from the gateway device GW, the transceiving unit 242 determines whether the destination of the user signal is an interface between the small base station PhNB and the user device UE (the PhUu interface) or an interface between the macro base station eNB and the user device UE (the Uu-U interface) (determines whether the destination user device UE is communicating through the macro base station eNB (the Uu-U interface) or through the small base station PhNB (the PhUu interface)) (S200). If the destination is the PhUu interface, the transceiving unit 242 relays the user signal to the small base station PhNB using the X3 signal transmission bearer X3-B, as shown in the figure (S210). If the destination is the Uu-U interface, the transceiving unit 242 transmits the user signal directly to the user device UE using the data radio bearer (S220).

According to the control signal relaying operation described above, the small base station PhNB can be controlled through the macro base station eNB. Furthermore, according to the user signal relaying operation, user signals can be exchanged through the small base station PhNB.

In particular, for the user device UE that is connected by radio to the small base station PhNB, whereas control signals are transmitted directly from the macro base station eNB, user signals are transmitted through the small base station PhNB. That is, according to the above-described configuration and operations, control-plane communication and user-plane communication can be separated.

1(6). Node Selecting Operation

Figure 14:
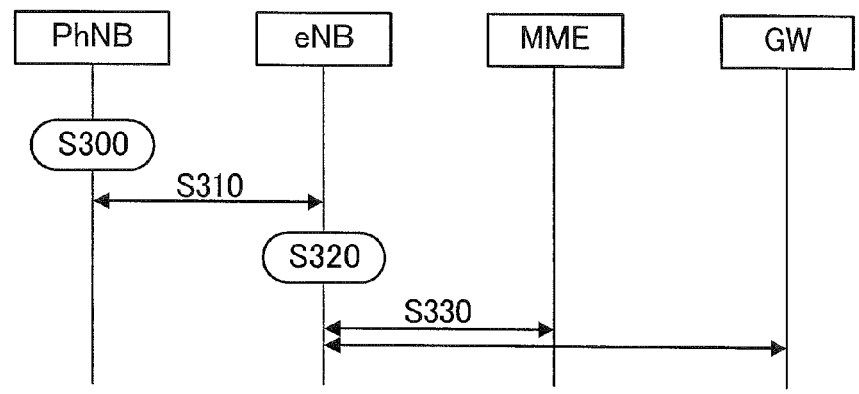
FIG. 14 is a sequence diagram showing a node selecting operation.

FIG. 14 is a sequence diagram showing a node selecting operation that is performed when an interface is set up. The base station selector 346 of the small base station PhNB selects a macro base station eNB to which the small base station PhNB is to connect when an X3 interface is set up (S300). More specifically, before an X3 interface is set up, the base station selector 346 obtains, from other nodes, information related to a macro base station eNB (e.g., information related to a network topology, information related to a geographical location of a macro base station eNB, etc.). The base station selector 346 selects, based on the obtained information, the macro base station eNB to which the small base station PhNB is to connect (to which an X3 interface is to be established). In selecting, the base station selector 346 may select a macro base station eNB that is close to (preferably, closest to) the small base station PhNB on the network topology, or may select a macro base station eNB that is geographically close to (preferably, closest to) the small base station PhNB. The base station selector 346 may select a single macro base station eNB or multiple macro base stations eNB. The base station selector 346 then sets up the X3 interface to the selected macro base station eNB (S310).

After the X3 interface has been set up, the node selector 246 of the selected macro base station eNB selects a switching center MME and a gateway device GW to which the macro base station eNB is to connect, in order to set up an S1-MME interface and an S1-U interface (S320). The selecting operation described above is specified in the 3GPP protocols (e.g., 3GPP TS 36.300 V11.1.0 (2012 March)). The node selector 246 then sets up the S1-MME interface and the S1-U interface (S330). Unlike the node selector 246 of a macro base station eNB, the base station selector 346 of a small base station PhNB does not have a function to select a switching center MME or a gateway device GW (NAS Node Selection Function, NNSF).

According to the node selecting operation described above, the small base station PhNB, which does not have a function to select a switching center MME or a gateway device GW, can communicate with the switching center MME and with the gateway device GW through the macro base station eNB.

1(7). Assignment of Communication Identifier

As described above with reference to FIG. 4, a bearer of the present embodiment (e.g., a signal transmission bearer X3-B) is identified by communication identifiers CI at both ends. Assigning of communication identifiers CI is described below.

When a signal transmission bearer X3-B is established, with respect to the signal transmission bearer X3-B to be established, the bearer controller 244 of the macro base station eNB generates a communication identifier CI-e that indicates the macro base station eNB and assigns the communication identifier CI-e to one end point of the signal transmission bearer X3-B. The bearer controller 244 then transmits the communication identifier CI-e to the small base station PhNB through the X3 interface. With respect to the signal transmission bearer X3-B to be established, the bearer controller 344 of the small base station PhNB generates a communication identifier CI-P that indicates the small base station PhNB and assigns the communication identifier CI-P to the other end point of the signal transmission bearer X3-B. The bearer controller 344 then transmits the communication identifier CI-P to the macro base station eNB through the X3 interface.

The bearer controller 244 of the macro base station eNB receives, from the small base station PhNB, and stores, in the storage unit 230, the communication identifier CI-P for the signal transmission bearer X3-B. The bearer controller 344 of the small base station PhNB receives, from the macro base station eNB, and stores, in the storage unit 330, the communication identifier CI-e for the signal transmission bearer X3-B.

According to the identifier assigning operation described above, the macro base station eNB recognizes the communication identifier CI-P at the small base station PhNB, and the small base station PhNB recognizes the communication identifier CI-e at the macro base station eNB. As a result, the macro base station eNB and the small base station PhNB can communicate using the signal transmission bearer X3-B identified by the communication identifier CI-e and the communication identifier CI-P.

1(8). Effect of Present Embodiment

According to the present embodiment described above, the macro base station eNB and the small base station PhNB that are in a hierarchical relationship (are different in rank) are connected appropriately, and communication between nodes is performed appropriately. Furthermore, because the macro base station eNB performs relaying operations with respect to the control plane and the user plane, the radio communication system CS can be provided in which the control plane and the user plane are separated.

2. Modifications

The above-illustrated embodiment can be modified in various ways. Specific modifications are illustrated below. Two or more of the freely selected ones of the above embodiment and the following illustrations can be combined, as appropriate, so long as the modifications are not adopted in such a way that they conflict.

2(1). Modification 1

The macro base station eNB and the small base station PhNB may be connected by wire or by radio. That is, an X3 interface (an X3 signal transmission bearer X3-B) may be provided by wired connection or by radio connection.

2(2). Modification 2

In the embodiment above, the small base station PhNB has an X2 interface. The small base station PhNB does not have to have an X2 interface. That is, the small base station PhNB may serve as an endpoint of an X2 interface, but does not have to serve as an endpoint of an X2 interface.

2(3). Modification 3

In the embodiment above, the small base station PhNB has an S1-U interface. The small base station PhNB need not have an S1-U interface.

2(4). Modification 4

Figure 15:
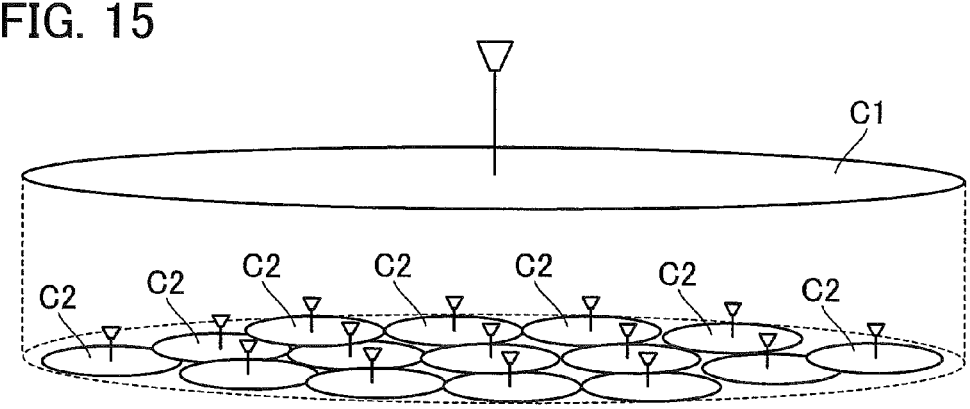
FIG. 15 is a drawing showing an example of a configuration of a macro cell formed by the macro base station and small cells formed by small base stations.

A configuration of cells formed by base stations (eNB and PhNB) can be chosen freely. FIG. 15 shows an example of a cell configuration. The macro base station eNB forms a macro cell C1 around it, and small base stations PhNB form small cells C2 around them. An antenna of each base station is schematically shown in each cell C. Although for descriptive purposes a plane on which the macro cell C1 is shown differs from a plane on which the small cells C2 are shown, in reality the macro cell C1 and the small cells C2 can be overlaid on the same plane such as a land surface. A cell C of a base station is a range within which radio waves from the base station effectively reach a user device UE. The user device UE can, therefore, communicate by radio with the base station that corresponds to the cell C within which the user device UE resides. Compared with the macro base station eNB, the small base stations PhNB are smaller in scale and have lower radio transmitting capabilities (average transmitting power, maximum transmitting power, etc.). A frequency band that the small base stations PhNB use for radio communication (a second frequency band; e.g., 3.5 GHz band) is higher in frequency and has a greater propagation loss than a frequency band that the macro base station eNB uses for radio communication (a first frequency band; e.g., 2 GHz band). The small cells C2 are therefore smaller in area than the macro cell C1. A configuration may be adopted in which an area of a macro cell C1 and an area of a small cell C2 are substantially the same.

2(5). Modification 5

The user device UE is a freely chosen device that can perform radio communication with base stations (the macro base station eNB and the small base stations PhNB). The user device UE may be a cell phone terminal, e.g., a feature phone or a smart phone, a desktop type personal computer, a laptop personal computer, a UMPC (ultra-mobile personal computer), a portable game machine, or another type of radio terminal.

2(6). Modification 6

In each of the elements in the radio communication system CS (the user device UE, the macro base station eNB, the small base stations PhNB, the switching center MME, and the gateway device GW), functions executed by the CPU may be instead executed by hardware or by a programmable logic device, such as an FPGA (Field Programmable Gate Array) and a DSP (Digital Signal Processor).

DESCRIPTION OF REFERENCE SIGNS

UE: User Device
110: Radio Communication Unit
120: Storage Unit
130: Controller eNB: Macro Base Station
210: Radio Communication Unit
220: Network Communication Unit
230: Storage Unit
240: Controller
242: Transceiving Unit
244: Bearer Controller
246: Node Selector
PhNB: Small Base Station
310: Radio Communication Unit
320: Network Communication Unit
330: Storage Unit
340: Controller
342: Transceiving Unit
344: Bearer Controller
346: Base Station Selector
MME: Switching Center
410: Network Communication Unit
420: Controller
GW: Gateway Device
510: Network Communication Unit
520: External Network Communication Unit
530: Controller
CI (CI-e, CI-P): Communication Identifier
CS: Radio Communication System
IN: Internet
NW: Network
S1-MME-B: S1-MME Signal Transmission Bearer
S1-U-B: S1-U Signal Transmission Bearer
SRB: Control Radio Bearer
X3-B: X3 Signal Transmission Bearer

The invention claimed is:

1. A superordinate base station in a radio communication system, the radio communication system comprising:
   the superordinate base station;
   a subordinate base station in which control functionality is more limited than control functionality of the superordinate base station;
   a user device that communicates by radio with each of the superordinate base station and the subordinate base station;
   a switching center; and
   a gateway device,
   the subordinate base station having neither an interface for control-plane communication with the user device nor an interface for control-plane communication with the switching center,
   the superordinate base station having:
   a Uu-C interface for control-plane communication with the user device;
   an X3 interface for at least one of control-plane communication and user-plane communication with the subordinate base station;
   an S1-MME interface for control-plane communication with the switching center; and
   a transceiving unit that performs control-plane transceiving with the user device through the Uu-C interface and performs transceiving with the subordinate base station through the X3 interface,
   wherein two communication identifiers are set to the superordinate base station and the subordinate base station, the two communication identifiers respectively identifying two end points of a bearer that is established through the X3 interface for transmitting the control message,
   wherein the superordinate base station further comprises a first bearer controller that assigns a first communication identifier to the superordinate base station, the first communication identifier being one of the two communication identifiers,
   wherein the subordinate base station comprises a second bearer controller that assigns a second communication identifier to the subordinate base station, the second communication identifier being the other one of the two communication identifiers, and
   wherein the first bearer controller transmits the first communication identifier to the subordinate base station through the X3 interface and stores the second communication identifier received through the X3 interface from the second bearer controller.

2. The superordinate base station according to claim 1, wherein the transceiving unit relays, from among user data transmitted from the gateway device, subordinate-user data to the subordinate base station through the X3interface, the subordinate-user data being directed to a user device that is connected to the subordinate base station by radio.

3. The superordinate base station according to claim 1, wherein the transceiving unit directly transmits to the user device, through the Uu-C interface, from among control messages transmitted from the switching center, a subordinate-user control message directed to a user device that is connected to the subordinate base station by radio.

4. The superordinate base station according to claim 1, wherein the X3 interface is provided by wired connection.

5. The superordinate base station according to claim 1, wherein the X3 interface is provided by radio connection.

6. A subordinate base station in a radio communication system, the radio communication system comprising:
   a superordinate base station;
   the subordinate base station in which control functionality is more limited than control functionality of the superordinate base station;
   a user device that communicates by radio with each of the superordinate base station and the subordinate base station;
   a switching center; and
   a gateway device,
   the subordinate base station having:
   a PhUu interface for user-plane communication with the user device; and
   an X3 interface for at least one of control-plane communication and user-plane communication with the superordinate base station,
   wherein operations of the subordinate base station are controlled by a control message transmitted from the superordinate base station through the X3 interface,
   wherein two communication identifiers are set to the superordinate base station and the subordinate base station, the two communication identifiers respectively identifying two end points of a bearer that is established through the X3 interface for transmitting the control message,
   wherein the superordinate base station further comprises a first bearer controller that assigns a first communication identifier to the superordinate base station, the first communication identifier being one of the two communication identifiers,
   wherein the subordinate base station comprises a second bearer controller that assigns a second communication identifier to the subordinate base station, the second communication identifier being the other one of the two communication identifiers, and wherein the second bearer controller transmits the second communication identifier to the superordinate base station through the X3 interface and stores the first communication identifier received through the X3 interface from the first bearer controller.

7. The subordinate base station according to claim 6, further having an S1-U interface for user-plane communication with the gateway device.

8. The subordinate base station according to claim 6, wherein the subordinate base station has no functionality to select at least one switching center from among multiple switching centers.

9. The subordinate base station according to claim 6, wherein the subordinate base station has no functionality to select at least one gateway device from among multiple gateway devices.

10. The subordinate base station according to claim 6, wherein the X3 interface is provided by wired connection.

11. The subordinate base station according to claim 6, wherein the X3 interface is provided by radio connection.

12. A radio communication system comprising:
a superordinate base station;
a subordinate base station in which control functionality is more limited than control functionality of the superordinate base station;
a user device that communicates by radio with each of the superordinate base station and the subordinate base station;
a switching center; and
a gateway device,
the superordinate base station having:
a Uu-C interface for control-plane communication with the user device;
an X3 interface for at least one of control-plane communication and user-plane communication with the subordinate base station;
an S1-MME interface for control-plane communication with the switching center; and
a transceiving unit that performs transceiving with the subordinate base station through the X3 interface,
the subordinate base station having neither an interface for control-plane communication with the user device nor an interface for control-plane communication with the switching center,
the subordinate base station having:
a PhUu interface for user-plane communication with the user device; and
an X3 interface for at least one of control-plane communication and user-plane communication with the superordinate base station,
wherein, operations of the subordinate base station are controlled by a control message transmitted from the superordinate base station,
wherein two communication identifiers are set to the superordinate base station and the subordinate base station, the two communication identifiers respectively identifying two end points of a bearer that is established through the X3 interface for transmitting the control message,
wherein the superordinate base station further comprises a first bearer controller that assigns a first communication identifier to the superordinate base station, the first communication identifier being one of the two communication identifiers,
wherein the subordinate base station comprises a second bearer controller that assigns a second communication identifier to the subordinate base station, the second communication identifier being the other one of the two communication identifiers,
wherein the first bearer controller transmits the first communication identifier to the subordinate base station through the X3 interface and stores the second communication identifier received through the X3 interface from the second bearer controller, and
wherein the second bearer controller transmits the second communication identifier to the superordinate base station through the X3 interface and stores the first communication identifier received through the X3 interface from the first bearer controller.

* * * * *